Patented June 25, 1946

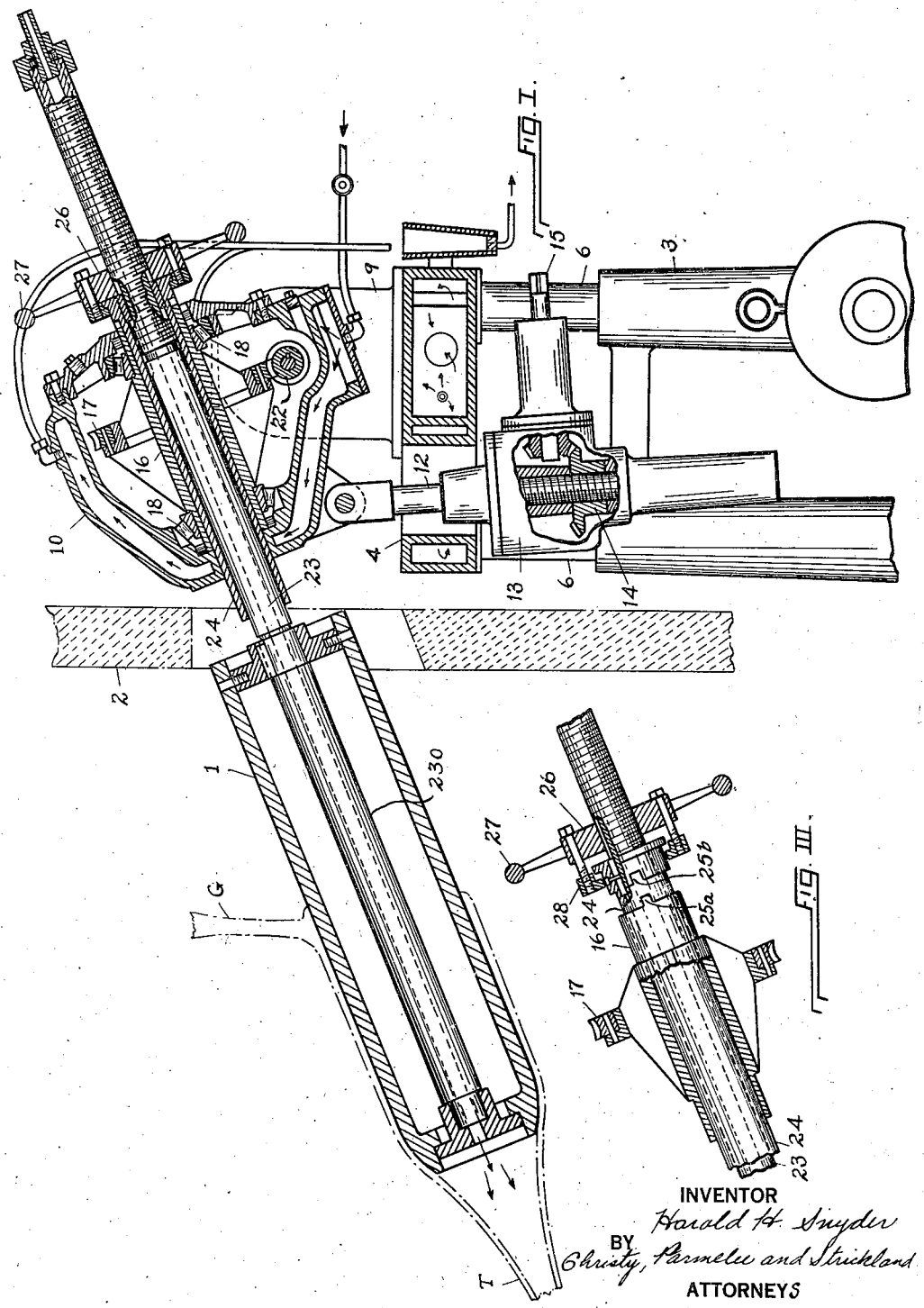

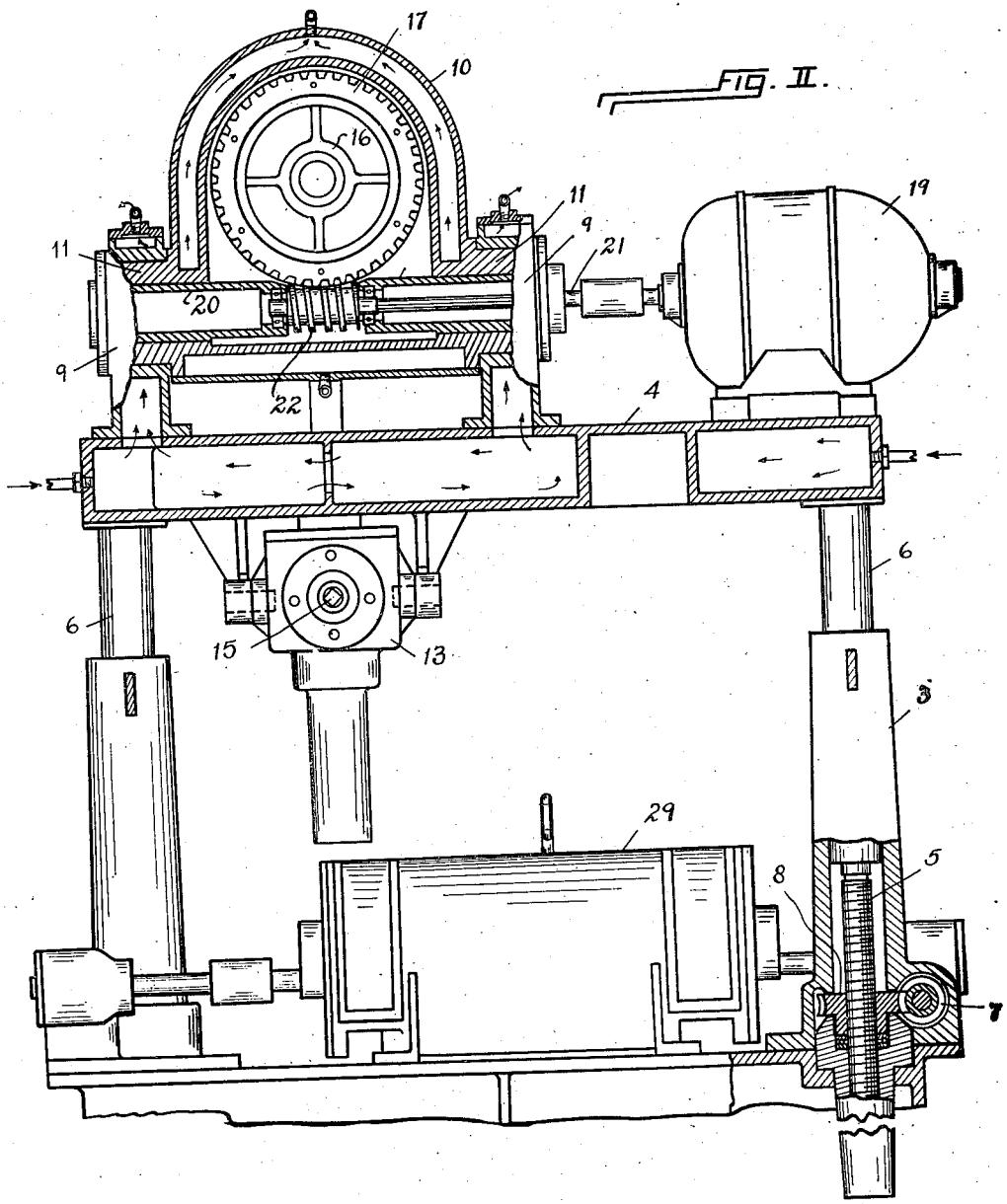

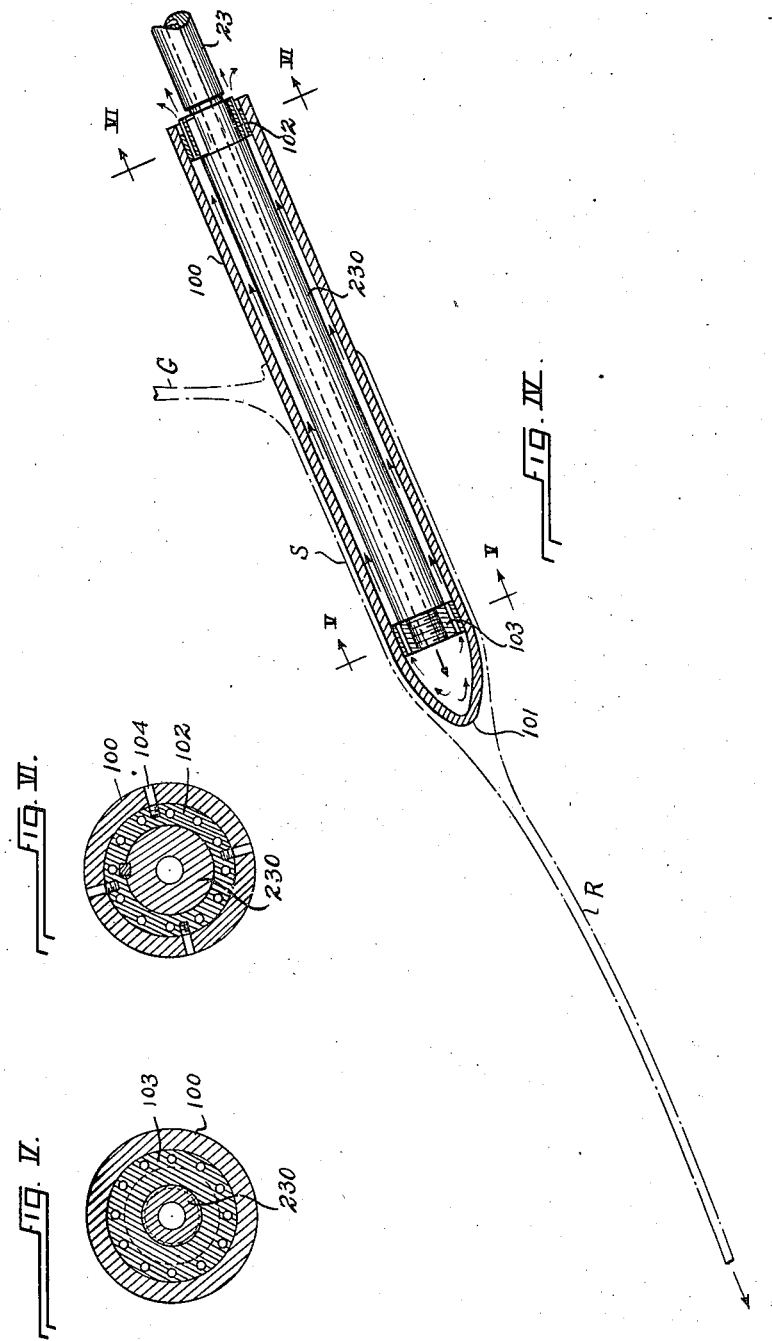

2,402,924

UNITED STATES PATENT OFFICE 2,402,924

APPARATUS FOR DRAWING ELONGATE GLASS SHAPES

Harold H. Snyder, Mount Lebanon, Pa., assignor to Forter-Teichmann Company, Pittsburgh, Pa., a corporation of Pennsylvania Application January 23, 1942, Serial No. 427,916

6 Claims. (Cl. 49—17.1)

This invention relates to the production of glass tubing and glass rod; and, particularly, to apparatus for rotating the mandrel upon which in continuous course glass is shaped. The objects in view are accuracy in the positioning of the mandrel, facility in adjustment, and economy in operation.

Apparatus embodying the invention is shown in the accompanying drawings. Fig. I is a view of the apparatus, seen, partly in side elevation, partly in vertical section; Fig. II is a view, partly in rear elevation, partly in vertical section (the plane of section being perpendicular to the plane of Fig. I); Fig. III is a fragmentary view, partly in elevation and partly in axial section, of the means employed for adjusting the mandrel in axial direction. In Fig. I the mandrel shown is such a mandrel as is suited to the production of tubing. Fig. IV is a view in axial section of a mandrel that may be employed in like assembly with that of Fig. I and suited to the production of rod. Figs. V and VI are views to larger scale and in transverse section of the mandrel of Fig. IV. The planes of section are correspondingly indicated by the lines V—V and VI—VI, Fig. VI.

Referring, first, to Fig. I, a hollow, cylindrical mandrel 1 is shown to extend obliquely downward through an opening in the wall 2 of a mandrel furnace. During operation this mandrel is rotated at properly controlled speed. The temperature within the furnace wall is maintained at a suitable elevated degree. A suitably controlled and uniform stream of molten glass G descends in continuity from above and impinges upon the surface of the mandrel; the molten glass spreads around the circumference of the turning mandrel; and from the lower and distal end of the mandrel the shaped tube T is drawn. The mandrel is essentially a cylindrical shell borne upon the extension 230 of a hollow stem 23. Through the stem and its extension air under suitable pressure is supplied, for maintaining the glass, as in plastic condition it is drawn from the mandrel, in the desired tubular form; and the air-filled space between the extension 230 and the shell 1 affords adequate insulation.

It is convenient to provide an electric motor to rotate the mandrel; and it is usual to provide a platform borne by the furnace structure, and to mount upon that platform the mandrel and its driving motor. I have observed in the operation of apparatus so mounted and carried that, responsive to variation consequent upon thermal expansion and contraction, the distal end of the mandrel, whence the tube is drawn, is subject to displacement from desiredly accurate position, and in consequence the product is subject to irregularity.

My invention involves, first, the provision of a standard 3, which standard may be understood to rest on firm ground, exteriorly of and independently of the furnace wall. Upon such standard, free of disturbance consequent upon thermal expansion and contraction of the furnace structure, the mandrel is borne; it is borne immediately by a platform 4, and the platform 4 is borne by the standard, and is vertically adjustable upon the standard. Upon the platform the mandrel is mounted to rotate, to swing upon a horizontal axis and in vertical plane, and also to be advanced and withdrawn in the direction of its axial extent. Thus the mandrel may be brought precisely to any desired position of height, of inclination, and of extension from its support.

The means for vertical adjustment of the platform 4 upon the standard 3 are found in screws 5 which rise vertically in the standard, which are vertically adjustable in the standard, and upon which the legs 6 of the platform 4 immediately rest. The drawings show a worm drive 7 for a nut 8 that engages one of the screws 5; and an assembly such that by the turning of the nut the screw may be extended or retracted. Obviously, and as is usual in such structure, the four screws upon which the four platform legs 6 severally rest may be severally adjusted, and when the four have been adjusted to desired relative positions they may be driven in unison.

Upon the platform 4 stands a pair of bearing blocks or members 9, and in these blocks, upon trunnions 11, a mandrel carrier in the form of a shell 10 is pivotally mounted. The shell is essentially cylindrical, and the axial line of its trunnions is perpendicular to the plane in which its own axis swings. The shell 10 is held to position and is adjusted in its position in its trunnion support by means of a stem 12 that extends from a box 13 pivotally mounted upon the platform 4. This stem is pivotally joined to the shell 10 at a point remote from the trunnion axis. The stem 12 is screw-threaded and is engaged by a nut 14 suitably mounted in box 13. The nut 14 carries a beveled gear and a shaft 15 carries an intermeshing beveled pinion, as illustrated in Fig. I. The shaft 15 extends through the wall of the enclosing casing, and at its outer end is shaped to receive a wrench. By an applied wrench, the nut 14 may be turned, the stem 12 extended or retracted, and the shell 10 swung on its trunnions.

A sleeve 16 extends axially through the shell 10, and carries, within the shell, a worm gear-wheel 17. The sleeve is borne by the shell 10 upon bearings 18, and so is rotatable within the shell and secure against axial displacement.

An electric motor 19 is mounted upon platform 4 and is axially aligned with the trunnions 11. The trunnions are hollow and sleeves 20 arranged within the trunnions afford bearing for the driven shaft 21 of the motor. The motor shaft carries a worm 22 which in the assembly meshes with the gear-wheel 17. Through such worm gear the motor rotates the sleeve 16.

The stem 23 of the mandrel 1 extends through the sleeve 16, and is connected to be rotated by the sleeve while being adjustable axially of the sleeve. Within the sleeve 16 and interposed between the sleeve and the mandrel stem 23 is a bushing 24 which is splined to the mandrel stem for rotation in unison therewith, while permitting longitudinal adjustment of the stem within the bushing, as will presently be described. The connection between the gear-equipped rotating sleeve 16 and the stem 23 includes a tongue 25a on the sleeve and a slot 25b formed in a shouldered portion on the bushing to receive and engage the tongue, as may be understood upon reference to the "exploded" view (Fig. III), it being understood that the parts are normally positioned so that the tongue is lodged in the slot. The sleeve and bushing are thus united for joint rotation under the propulsion of the gear 17, and, since the bushing is splined to the stem 23, the stem is connected to rotate in unison with the sleeve 16.

The stem 23 is screw threaded over the portion of its extent indicated in Fig. I, and carries a nut 26 that forms the hub of a hand-wheel 27. Under the effect of gravity acting on the inclined mandrel and stem, the stem tends to slide downward in the bushing 16 to which it is splined, but such movement is prevented by the threaded hand-wheel 26, 27 on the stem bearing against the upper collared end of the bushing, and this pressure on the end of the bushing tends to shift the bushing downward within the sleeve 16, which results in the tongue-and-slot engagement 25a, 25b between the sleeve and the bushing being maintained at all times, save only when the mandrel is intentionally drawn upward in the assembly, as is desired to dismantle the parts for repair or replacement.

In order to regulate the distance the mandrel extends through the opening in the wall 2 of the mandrel furnace, it is necessary only to rotate the hand-wheel 26, 27 relatively to the threaded stem 23. Rotation of the hand-wheel in one direction permits the mandrel and its stem to move downward (right-to-left direction, Fig. I) in its mounting. Alternately, rotation of the hand-wheel in opposite direction moves the mandrel upward (left-to-right direction), to decrease the extent of the mandrel into the furnace.

In order normally to prevent an unintended relative rotation between the hand-wheel and the stem on which it is threadedly engaged, a clamping ring 28 is bolted to the hand-wheel, as shown, and is adapted to engage the collar on the upper end of the bushing 24, and, since the bushing is splined to the threaded stem 23, the hand-wheel cannot rotate relatively to the stem and thus disturb the mandrel in its adjusted position.

The mandrel 1, the stem 23 that carries it, and the bushing 24 are, all of them, exposed to intense heat. These parts, though formed of highly refractory materials, are relatively impermanent; they wear and burn away, and have frequently to be replaced. The mandrel and its stem, however, are shorter lived than the bushing: they have to be replaced (the apparatus being in continuous operation) weekly, or thereabouts; the bushing 24, however, may last for a month or six weeks. It is because of such conditions that the separable union 25a, 25b between the bushing 24 and the sleeve 16 is provided. When the bushing at its forward end (to the left, Figs. I and III) becomes too greatly burned away, it is withdrawn from the sleeve and replaced, it being necessary merely to remove the bolts that secure ring 28 to the hand-wheel, then unscrew the hand-wheel from the stem 23, withdraw the bushing, and replace it. Of course, when the hand-wheel is removed from the stem, the stem and the mandrel may also, if necessary, be removed from assembly and replaced.

The stem 23 of the mandrel is hollow, as is conventional, that the developing tube may be subjected interiorly to proper fluid pressure.

The platform 4, the bearing blocks 9, and the face of the shell 10 that is exposed to furnace heat through the opening in wall 2 are advantageously water-cooled, as the drawings show.

In operation, the mandrel rotates and the speed of rotation, while subject to regulation, must be uniform at the regulated value. I have found that I may gain this effect to a degree of perfection not heretofore realized by employing a variable-speed motor drive. This is a piece of equipment that is known and is available on the market. In Fig. II a casing 29 is shown, and within this casing it may be understood that an A. C. squirrel-cage motor is arranged to drive a D. C. series-wound generator that provides the current for the motor 19, already described.

Figs. V, VI, and VII illustrate a mandrel adapted to the production of rod, as distinguished from tube. The mandrel 100, instead of being ported at the tip, as is the mandrel of Fig. I, is closed, tapered, and rounded, as indicated at 101. It serves to distribute the glass that descends in a stream G upon its rotating surface, and from the tip of the mandrel the sleeve S of still plastic glass is drawn, and collapses as it is drawn, to form the rod R. The open-ended mandrel 1 of Fig. I is sufficiently insulated by the air chamber described; the closed mandrel of Fig. V may be cooled by a stream of fluid (conveniently air) that flows through the extension 230 of the hollow stem 23 to the distal end of the mandrel, and returns, with cooling effect, through the annular space provided between the extension 230 and the inner surface of the shell that constitutes the mandrel 100. The drawings show a convenient mounting for the mandrel upon the extension 230 of the stem 23, consisting in perforated rings 102 and 103 arranged at the inner and outer ends of the mandrel. The ring at the inner end, the ring 102, is keyed to the extension 230 of the stem 23 and to it the shell-like mandrel is secured by screws 104; the ring 103 is borne by screw-thread engagement upon the end of extension 230, and it fits snugly within the shell-like mandrel.

In preparation for operation the height at which the platform 4 shall stand is determined by the turning of the screws 5; the degree of downward inclination of the mandrel 1 (100) is determined by the turning of shaft 15; and the amount of the extension of the mandrel inwardly beyond the furnace wall is determined by the adjustment of the nut 26 upon the stem 23 of the mandrel. Operation then goes forward in usual and well-known manner.

Among the advantages are these:

The mandrel, once adjusted to position, continues in position, undisturbed by thermal movement of the furnace walls; and, in consequence, the product gains in uniformity.

The three movements to which the mandrel is responsive in adjustment of its position may readily be effected, and two of them without intermission of operation.

The mandrel is independent of the motor in its swinging in vertical plane, upon the trunnions 11. This is not merely a matter of simplification and a gain in facility of adjustment; it eliminates the disadvantage that otherwise must be accepted: the disadvantage, namely, that the swinging of a motor in vertical plane is prejudicial to motor operation.

The accuracy in the position of the mandrel, the constancy in the position of the mandrel, the minute adjustability to which the mandrel in operation is subject, the constancy in speed of rotation of the mandrel, and the minute adjustability of the speed at which the mandrel rotates all lend themselves to the other variables of the tube-forming operation—the variables, namely of temperature of the glass, fluidity of the glass, rate of flow of the glass, pressure within the developing tube, and the tension under which the tube is drawn—to afford a product of superior uniformity and quality.

I claim as my invention:

1. Glass-drawing apparatus comprising a supporting base structure having spaced bearing members, a mandrel carrier having trunnions received in said bearing members for supporting the carrier upon said supporting base structure, at least one of said trunnions being hollow, a bushed sleeve rotatable in said carrier, a drive shaft extending through said hollow trunnion of said carrier, a motor connected to said drive shaft, drive gearing housed within said carrier and connecting said drive shaft and said sleeve, and a mandrel stem mounted for rotation with said sleeve, a mandrel secured to said stem, means for longitudinally adjusting said stem in said sleeve, and means for angularly adjusting said carrier and mandrel upon the common axis of said trunnion and said drive shaft.

2. Glass-drawing apparatus comprising a standard, a supporting base structure rigidly mounted for vertical adjustment on said standard, said supporting base structure having spaced bearing members, a mandrel carrier having a water cooled wall, said mandrel carrier having trunnions received in said bearing members for supporting the carrier upon said supporting base structure, at least one of said trunnions being hollow, a bushed sleeve rotatable in said carrier, a drive shaft extending through said hollow trunnion of said carrier, a motor connected to said drive shaft, drive gearing housed within said carrier and connecting said drive shaft and said sleeve, and a mandrel stem mounted for rotation with said sleeve, a mandrel secured to said stem, and means for angularly adjusting said carrier and mandrel upon the common axis of said trunnion and said drive shaft.

3. Glass-drawing apparatus comprising a supporting base structure having spaced bearing members, a mandrel carrier having trunnions received in said bearing members for supporting the carrier upon said supporting base structure, at least one of said trunnions being hollow, a mandrel stem rotatably mounted in said carrier and extending therefrom, a mandrel mounted on the extending portion of said stem, a drive shaft extending through said hollow trunnion of said carrier, a motor connected to said drive shaft, and mechanism arranged within said carrier for connecting said drive shaft to said stem, whereby the stem and mandrel may be rotated.

4. Glass-drawing apparatus comprising a supporting base structure having spaced bearing members, a mandrel carrier having axially aligned trunnions received in said bearing members for supporting the carrier upon said supporting base structure, at least one of said trunnions being hollow, a mandrel stem rotatably mounted in said carrier and extending therefrom, a mandrel mounted on the extending portion of said stem, a drive shaft extending through said hollow trunnion of said carrier, a motor connected to said drive shaft, mechanism arranged within said carrier for connecting said drive shaft to said stem, whereby the stem and mandrel may be rotated, and means for angularly adjusting said carrier and mandrel upon the axis of said trunnions.

5. Glass-drawing apparatus comprising a standard, a supporting base structure rigidly mounted for vertical adjustment on said standard, said supporting base structure having spaced bearing members, a mandrel carrier having a water cooled wall, said mandrel carrier having trunnions received in said bearing members for supporting the carrier upon said supporting base structure, at least one of said trunnions being hollow, a mandrel stem rotatably mounted in said carrier and extending therefrom, a mandrel mounted on the extending portion of said stem, a drive shaft extending through said hollow trunnion of said carrier, a motor connected to said drive shaft, and mechanism arranged within said carrier for connecting said drive shaft to said stem, whereby the stem and mandrel may be rotated.

6. Glass-drawing apparatus comprising a standard, a supporting base structure rigidly mounted for vertical adjustment on said standard, said supporting base structure having spaced bearing members, a mandrel carrier having a water cooled wall, said mandrel carrier having axially aligned trunnions received in said bearing members for supporting the carrier upon said supporting base structure, at least one of said trunnions being hollow, a mandrel stem rotatably mounted in said carrier and extending therefrom, a mandrel mounted on the extending portion of said stem, a drive shaft extending through said hollow trunnion of said carrier, a motor connected to said drive shaft, mechanism arranged within said carrier for connecting said drive shaft to said stem, whereby the stem and mandrel may be rotated, and means for angularly adjusting said carrier and mandrel upon the axis of said trunnions.

HAROLD H. SNYDER.